(12) United States Patent
Chiu et al.

(10) Patent No.: US 8,086,180 B2
(45) Date of Patent: Dec. 27, 2011

(54) METHOD FOR RESTRAINING INTER-CELL INTERFERENCE IN A MOBILE COMMUNICATION SYSTEM

(75) Inventors: Che-Sheng Chiu, Taoyuan County (TW); Chih-Hsuan Tang, Taoyuan County (TW); Chia-Horng Liu, Taoyuan County (TW)

(73) Assignee: Chunghwa Telecom Co., Ltd., Taoyuan County (TW)

( * ) Notice: Subject to any disclaimer, the term of this patent is extended or adjusted under 35 U.S.C. 154(b) by 363 days.

(21) Appl. No.: 12/427,125

(22) Filed: Apr. 21, 2009

(65) Prior Publication Data

US 2010/0267338 A1 Oct. 21, 2010

(51) Int. Cl.
*H04B 15/00* (2006.01)

(52) U.S. Cl. ....... 455/63.1; 370/329; 375/260; 455/450; 455/452.1; 455/452.2; 455/501

(58) Field of Classification Search ................... 370/329; 375/260; 455/63.1, 450, 452.1, 452.2, 501
See application file for complete search history.

(56) References Cited

U.S. PATENT DOCUMENTS

| | | | |
|---|---|---|---|
| 7,069,009 B2 * | 6/2006 | Li et al. | 455/446 |
| 7,706,246 B2 * | 4/2010 | Hartman, Jr. | 370/204 |
| 7,962,091 B2 * | 6/2011 | Oyman et al. | 455/7 |
| 2007/0177501 A1 * | 8/2007 | Papasakellariou | 370/229 |
| 2008/0057996 A1 * | 3/2008 | Sung et al. | 455/522 |
| 2009/0047971 A1 * | 2/2009 | Fu | 455/450 |
| 2009/0081955 A1 * | 3/2009 | Necker | 455/63.1 |
| 2009/0092059 A1 * | 4/2009 | Fu | 370/252 |
| 2009/0201867 A1 * | 8/2009 | Teo et al. | 370/329 |
| 2009/0233544 A1 * | 9/2009 | Oyman et al. | 455/7 |
| 2009/0247148 A1 * | 10/2009 | Chen et al. | 455/422.1 |
| 2010/0081441 A1 * | 4/2010 | Tao et al. | 455/450 |
| 2010/0087203 A1 * | 4/2010 | Lee et al. | 455/452.2 |
| 2010/0099450 A1 * | 4/2010 | Lu et al. | 455/501 |
| 2010/0197314 A1 * | 8/2010 | Maaref et al. | 455/450 |
| 2011/0081865 A1 * | 4/2011 | Xiao et al. | 455/63.1 |
| 2011/0116410 A1 * | 5/2011 | Sung et al. | 370/252 |
| 2011/0143674 A1 * | 6/2011 | Lim et al. | 455/63.1 |
| 2011/0151881 A1 * | 6/2011 | Chou et al. | 455/447 |
| 2011/0158168 A1 * | 6/2011 | Chen et al. | 370/328 |
| 2011/0194423 A1 * | 8/2011 | Cho et al. | 370/252 |
| 2011/0222525 A1 * | 9/2011 | Kishigami et al. | 370/343 |

* cited by examiner

*Primary Examiner* — Lincoln Donovan
*Assistant Examiner* — William Hernandez
(74) *Attorney, Agent, or Firm* — Schmeiser Olsen & Watts LLP

(57) ABSTRACT

A method for restraining inter-cell interference in a mobile communication system is provided. The method uses the fast dynamic selection of the Fractional Frequency Reuse (FFR) technology and the Macro Diversity (MD) technology of the cell edge to increase the cell edge user data rate and provide excellent system capacity. The method is particularly suitable in a OFDMA mobile communication system downlink. The method comprises the steps of: (a) determining whether the cell edge user is able to operate the MD technology; (b) processing the fast dynamic selection of the FFR technology and the MD technology for the cell edge user, and the selection is made based on a instantaneous link Signal Quality Index (SQI); and (c) allocating the center subband or the edge subband to the cell edge user according to the selection.

9 Claims, 4 Drawing Sheets

METHOD FOR RESTRAINING INTER-CELL INTERFERENCE IN A MOBILE COMMUNICATION SYSTEM

BACKGROUND OF THE INVENTION

1. Field of the Invention

The present invention relates to a method for restraining inter-cell interference in a mobile communication system. More particularly, the present invention relates to a hybrid method of fast dynamic selection of a fractional frequency reuse technology and Macro Diversity technology in a cell edge, and the method is applied in an Orthogonal Frequency Division Multiple Access (OFDMA) mobile communication system downlink.

2. Description of the Prior Art

The Orthogonal Frequency Division Multiple Access (OFDMA) technology is used with the 4th generation (4G) mobile communication technology. The standards for 4G technologies are developed and regulated by several primary organizations, such as IEEE 802.16m, 3GPP LTE-Advanced, and 3GPP2 UMB+, which are all concerned with air interface technologies based on OFDMA technology.

In the OFDMA system, the time-frequency two-dimensional electric waves are composed of a Orthogonal Frequency Division Multiplex (OFDM) signal in the time domain and a frequency subchannel in the frequency domain. Each frequency subchannel is composed of a plurality of different subcarriers. In an OFDM signal time interval, each user in the cell uses a orthogonal frequency subchannel, therefore, the OFDMA system is free from intra-cell interference, which is an important character of the OFDMA system. When different cells or users use the same frequency subchannel for transmitting messages in the same time interval, inter-cell co-channel interference (also called inter-cell interference) occurs. Thus, the link quality of the cell edge user degrades and the data throughput decreases, which are serious problems in OFDMA systems.

In the future, the 4G mobile communication systems, such as the IEEE 802.16m, 3GPP LTE-Advanced, and 3GPP2 UMB+, all utilize inter-cell interference coordination technology to solve the problem of inter-cell interference. The inter-cell interference coordination technology is configured to coordinate the frequency, time, and/or emitting power between the neighbor cells in advance, to avoid or decrease inter-cell interference. Presently, many methods have been developed to reduce inter-cell interference, such as the partial frequency reuse, fractional frequency reuse, soft frequency reuse, and inverted frequency reuse technologies. The fractional frequency reuse (FFR) technology is considered to have the greatest potential for development and is widely used. Presently, pre-4G technologies, such as the 3GPP2 UMB and Mobile WiMAX (IEEE 802.16e), uses FFR technology to combat the problem of inter-cell interference.

FFR technology is a kind of frequency-domain interference coordination technology, which applies a frequency reuse factor (FRF) larger than 1 for planning the frequency in the cell edge region to reduce inter-cell interference. Thus the link quality is considered to be improved, and the data throughput is considered to be increased. However, FFR technology applies the FRF equal to 1 (reuse-1 or FRF=1) in the cell center region to maintain superior system capacity. The use of FRF equal to one creates an inefficient use of cellular system resources.

A mobile communication network comprises a base station controlling one or more cells (or sectors). Usually, a base station controls three cells (sectors). FIG. 1A shows a base station 10 controlling three cells. FIGS. 1A and 1B are conventional frequency resource allocation diagram for realizing the FFR technology in the mobile communication network base station 10. The useful frequency shown in the system in FIGS. 1A and 1B is divided into center subband F1 12 and edge subband F3 11, in which the edge subband F3 11 is divided into three orthogonal subbands F3A, F3B, and F3C, that is, the useful frequency comprises four orthogonal subbands.

Referring to FIGS. 1A and 1B, the center subband F1 12 is adapted for an FRR equal to 1 (reuse-1) reuse method, which means all cells can use the subband. The edge subband F3 11 is adapted for a FRF equal to 3 (reuse-3 or FRF=3) reuse method, and the three subbands F3A, F3B, and F3C are adapted for the cell A13, cell B14 and cell C 15 of the base station 10 respectively. Taking cell A 13 as an example, the center subband FT 12 of the cell A 13 is allocated to the neighbor users around the center of cell, and the spectral efficiency of the subband is the highest one. On the other hand, the edge subband F3A of the cell A 13 is first allocated to the cell edge user. At this time, the reuse-3 reuse method is applied, and the link quality of the edge user is improved.

For general purposes, the mobile communication network is assumed to have a base station 10 controlling three cells (sectors).

FIG. 2 illustrates the conventional FFR technology operation flow chart for application in a mobile communication network, comprising the steps as follows:

Step 1 is executed so that the User Equipment (UE) is configured to measure the link signal quality and report the result to the serving cell (or serving sector) (201), in which the Signal Quality Index (SQI) can be a wideband average signal to interference plus noise ratio (SINR).

Step 2 is executed so that a detector in the serving cell determines whether the UE is a cell center user or a cell edge user by determining whether the signal quality is smaller than a threshold level (202).

Step 3 is executed to identify the UE as a cell center user once the wideband average SINR is not smaller than the threshold level (203).

Step 4 is executed so that when the UE retrieves the first transmission priority from a scheduler and the UE is a cell center user, the system then allocates the frequency subchannel of the center subband (i.e. F1) of the serving cell to the user, and processes the transmission with the reuse-1 method (204).

Step 5 is executed to identify the UE as a cell edge user once the wideband average SINR is smaller than the threshold level (205).

Step 6 is executed so that the system allocates the frequency subchannel of the edge subband (i.e. F3A, F3B, or F3C) of the serving cell to the user when the UE is a cell edge user, and processes the transmission with the reuse-3 method (206).

According to the technical requirements of 4G technology issued by the International Telecommunication Union (ITU), the cell edge data rate is an important performance index. However, it is generally believed that the system capacity and the cell edge capacity have an inverse relationship. Presently, a OFDMA mobile communication system that applies the FFR technology to combat inter-cell interference is able to improve the cell edge capacity (or the cell edge data rate) but must then sacrifice significant system capacity. Thus, developing a method for restraining inter-cell interference with better efficiency as well as obtaining a better balance between the system capacity and the cell edge capacity becomes an important and challenging issue for mobile communication systems based on the OFDMA technology.

The inventor made improvements over the aforementioned drawbacks of the conventional products, and develops the present invention of method for restraining inter-cell interference in a mobile communication system.

SUMMARY OF THE INVENTION

The primary objective of the present invention is to provide a method for restraining inter-cell interference in a mobile communication system. The present invention is configured to provide a better signal quality for a cell edge user to enlarge a data throughput of the cell edge user and meanwhile maintain increased system capacity. More particularly, the method of the present invention is compatible in a downlink of an OFDMA mobile communication system.

The method for restraining inter-cell interference in a mobile communication system that can achieve the aforementioned objective combines a Frequency Fractional Reuse (FFR) technology and a Macro Diversity (MD) technology. The method aims at providing a fast dynamic selection of the FFR technology (when a Frequency Reuse Factor (FRF) is larger than 1 (FRF>1)) or the MD technology for the cell edge user of the OFDMA mobile communication system. The method is executed to determine whether the cell edge user is able to operate the MD technology by a Handover List Size (HLS). If the HLS of the cell edge user is larger than 1 (HLS>1), then a base station 10 is configured to operate the fast dynamic selection to select the FFR technology or the MD technology which acquires a better instantaneous link quality according to the instantaneous link Signal Quality Index (SQI) for the cell edge user during a time interval. Then the base station 10 allocates a frequency subchannel of a center subband or an edge subband to the cell edge user.

These features and advantages of the present invention will be fully understood and appreciated from the following detailed description of the accompanying Drawings.

DETAILED DESCRIPTION OF THE PREFERRED EMBODIMENT

Figure 3:
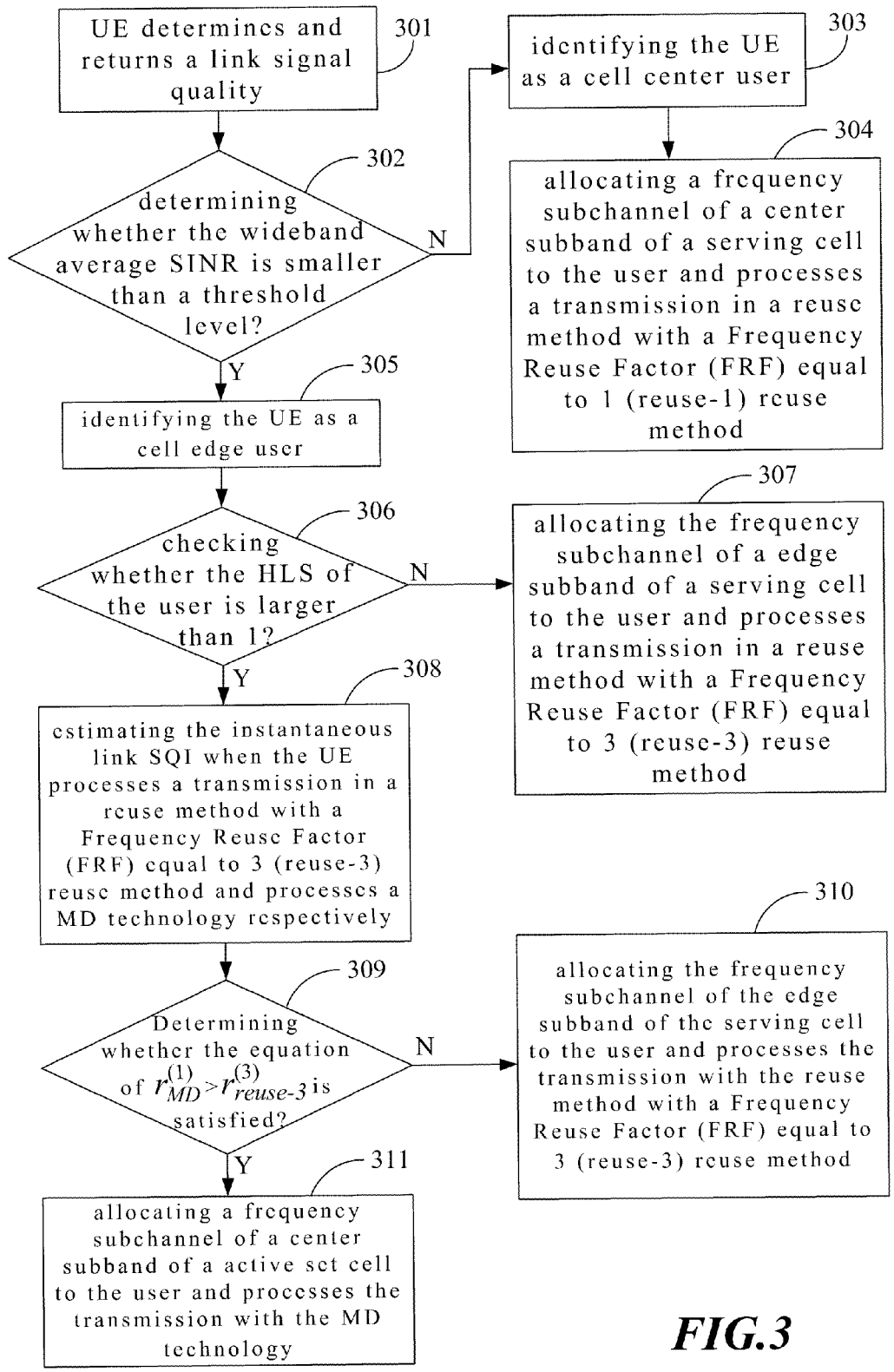
FIG. 3 illustrates a flow chart of a method for restraining inter-cell interference in a mobile communication system of the present invention.

FIG. 3 shows a flow chart of a method for restraining inter-cell interference in a mobile communication system of the present invention. Generally, it is assumed that a mobile communication network comprises a base station controlling three cells or sectors as a unit. The method comprises the following steps:

Step 1 is executed so that the UE determines a link signal quality and returns the result to a serving cell, in which the Signal Quality Index (SQI) can be a wideband average signal to interference plus noise ratio (SINR) (301).

Step 2 is executed so that a detector in the serving cell determines whether the wideband average SINR is smaller than a threshold level (302).

Step 3 is executed to identify the UE as a cell center user once the wideband average SINR is not smaller than the threshold level (303).

Figure 1A:
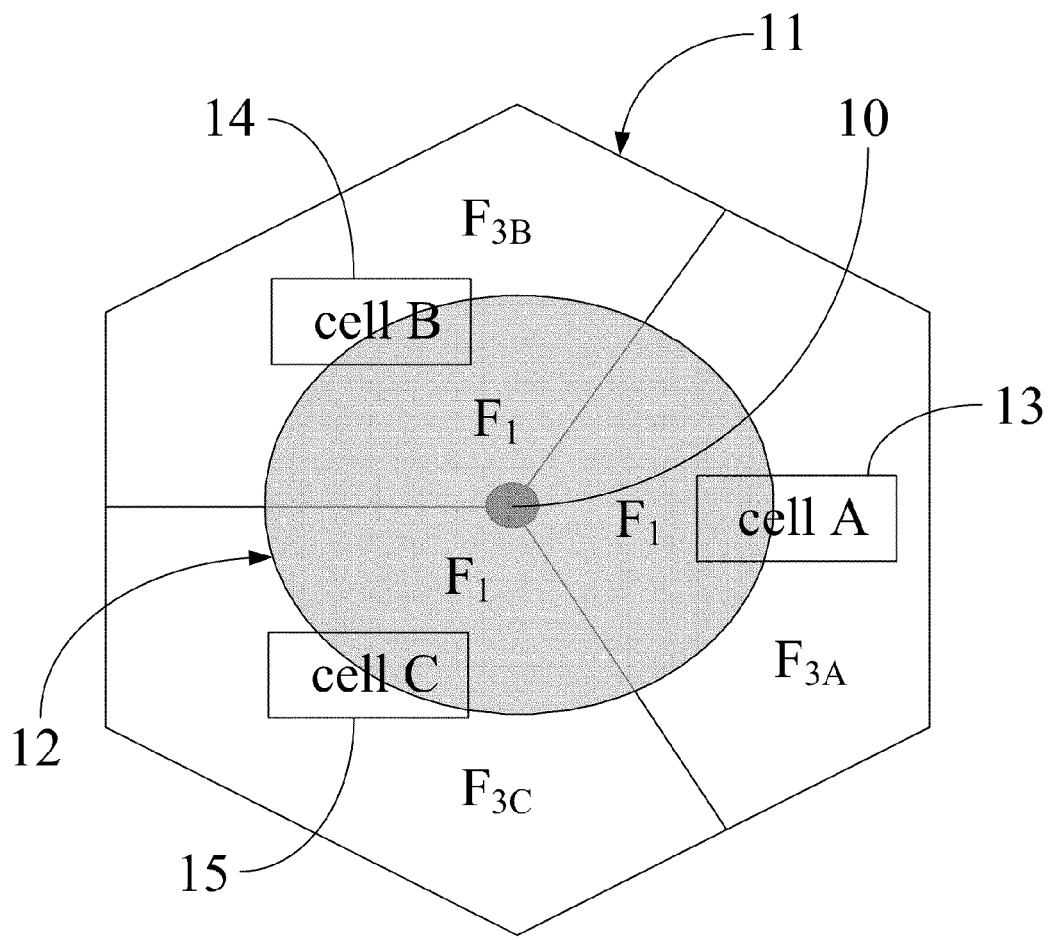
FIGS. 1a and 1b illustrate the conventional frequency resource allocation diagram of the Fractional Frequency Reuse technology applied in a base station of a mobile communication system.
Figure 1B:
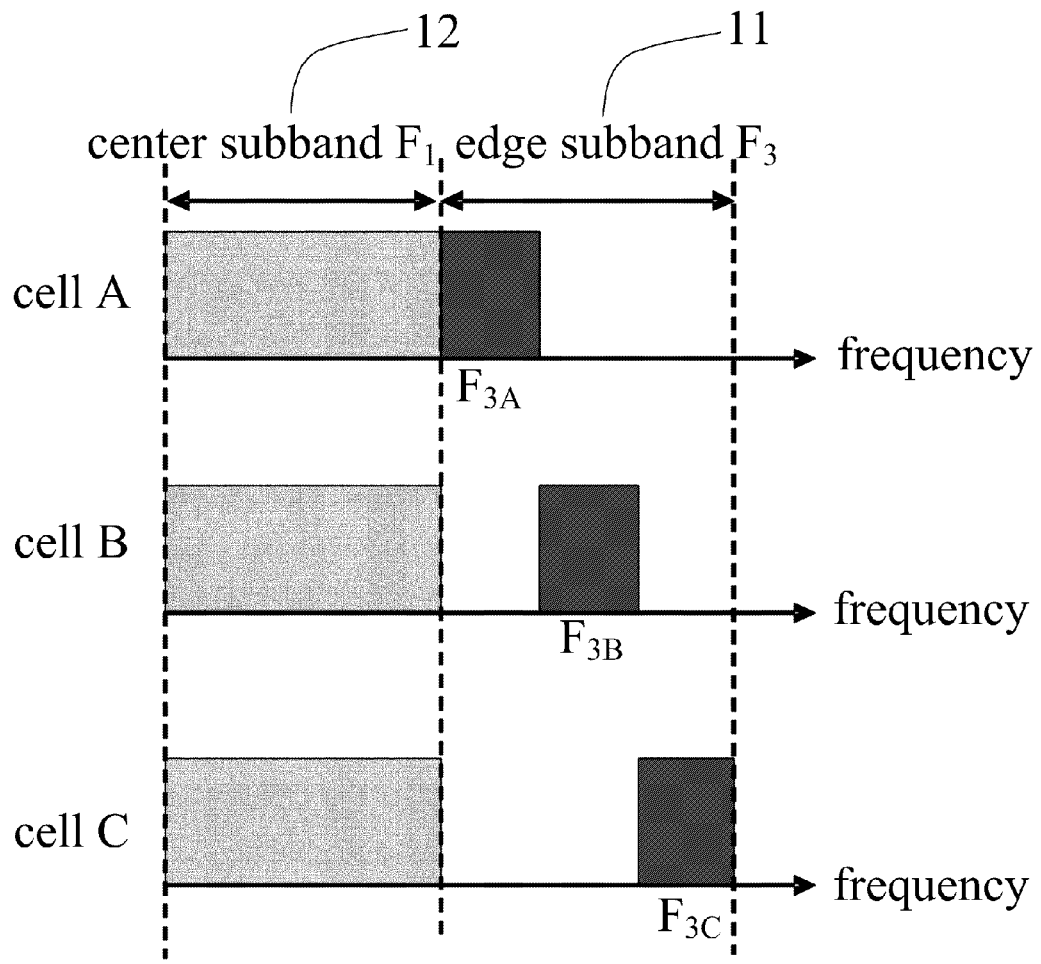
Figure 2:
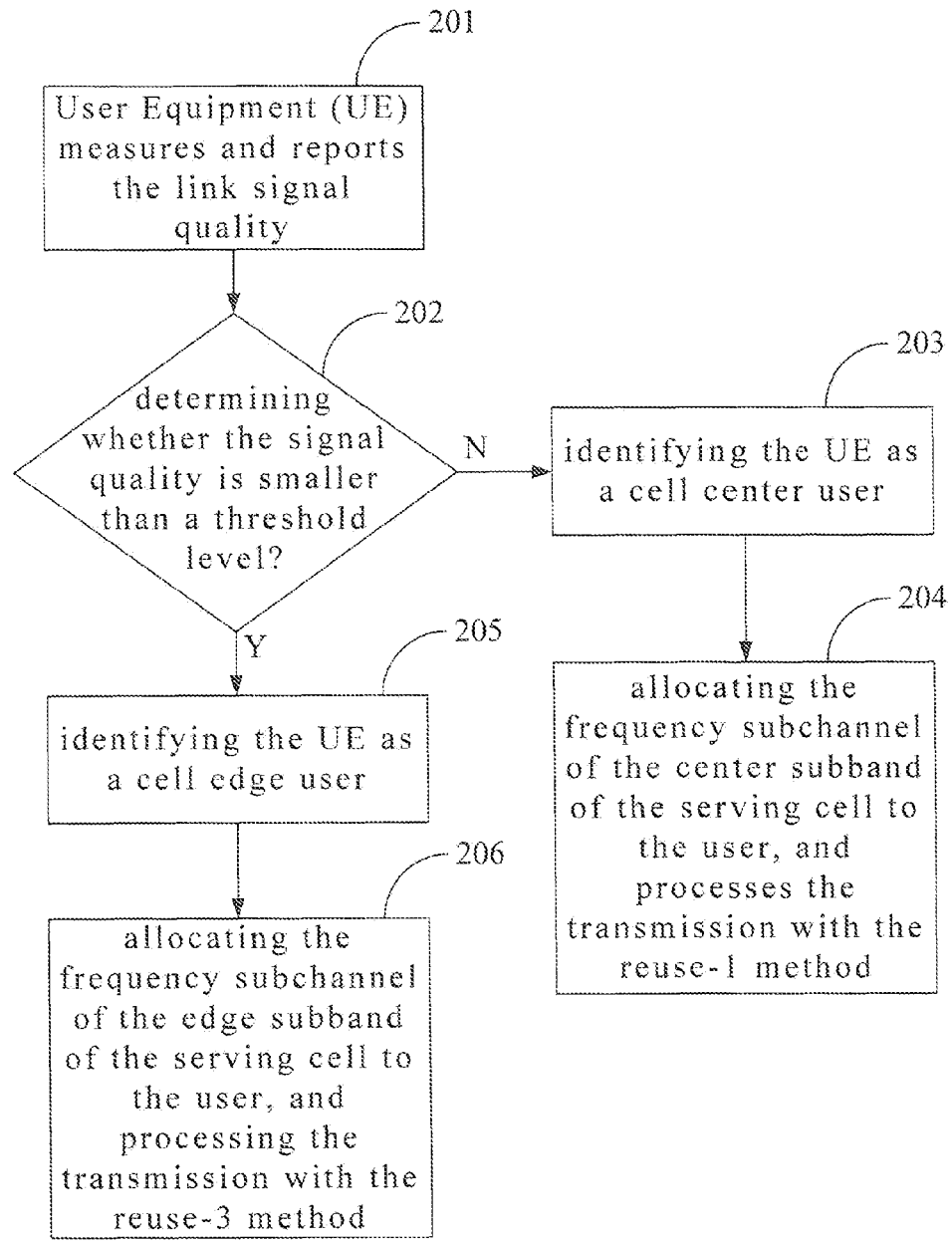
FIG. 2 illustrates the conventional FFR technology operation flow applied in a mobile communication network.

Step 4 is executed so that the system allocates a frequency subchannel of a center subband of a serving cell to the user and processes a transmission in a reuse method with a Frequency Reuse Factor (FRF) equal to 1 (reuse-1) reuse method, in which the center subband is denoted as "F1" in FIGS. 1A and 1B (304).

Step 5 is executed to identify the UE as a cell edge user once the wideband average SINR is smaller than the threshold level (305).

Step 6 is executed so that the detector is configured to check whether the HLS of the user is larger than 1, and the determining step is executed to determine whether the cell edge user is able to operate a MD technology, when the UE is treated as a cell edge user (306).

Step 7 is executed so that the system allocates the frequency subchannel of a edge subband of a serving cell to the user and processes a transmission in a reuse method with a Frequency Reuse Factor (FRF) equal to 3 (reuse-3) reuse method according to a NO message from the detector when the HLS of the cell edge user is equal to 1 representing that the cell edge user is not able to operate the MD technology, in which the edge subband is denoted as "F3A", "F3B", or "F3C" in FIGS. 1A and 1B (307).

Step 8 is executed so that the base station estimates the instantaneous link SQI in different situations when the UE processes a transmission in a reuse method with a Frequency Reuse Factor (FRF) equal to 3 (reuse-3) reuse method and processes a MD technology respectively according to a YES message from the detector when the HLS of the cell edge user is larger that 1 representing that the cell edge user is able to operate the MD technology, in which the index can be an instantaneous SINR (308).

Step 9 is executed so that the base station processes the fast dynamic selection step to select one of the reuse method with a Frequency Reuse Factor (FRF) equal to 3 (reuse-3) or the MD technology that has a better instantaneous link signal quality and to render the selected transmission method to the UE during a time interval of a range from 20 milliseconds to 1 second, in which the selection criterion is whether the equation $r_{MD}^{(1)} > r_{reuse-3}^{(3)}$ is satisfied(309). Wherein the $\gamma_{MD}$ and $\gamma_{reuse-3}$ respectively represent the instantaneous link Signal Quality Indexes of when the cell edge user processes the MD technology and the reuse method with a Frequency Reuse Factor (FRF) equal to 3 (reuse-3), and the $\gamma^{(1)}$ and $\gamma^{(3)}$ respectively represent the reuse method with a FRF equal to 1 (reuse-1) at the center subband and the reuse method with a FRF equal to 3 (reuse-3) at a frequency subchannel of the edge subband, then the frequency subchannels are allocated according to the selection result in the allocation step.

Step 10 is executed so that the system allocates the frequency subchannel of the edge subband of the serving cell to the user and processes the transmission with the reuse method with a Frequency Reuse Factor (FRF) equal to 3 (reuse-3) reuse method when the equation $r_{MD}^{(1)} > r_{reuse-3}^{(3)}$ is not satisfied representing that applying the reuse method with a Frequency Reuse Factor (FRF) equal to 3 (reuse-3) acquires better link signal quality, in which the edge subband is denoted as "F3A", "F3B", or "F3C" in FIGS. 1A and 1B (310).

Step 11 is executed so that the system allocates a common frequency subchannel of a center subband of a active set cell to the user and processes the transmission with the MD technology when the equation $r_{MD}^{(1)} > r_{reuse-3}^{(3)}$ is satisfied representing that applying the MD technology acquires better link signal quality (311). The active cell set is the cell that participates as one of the cells applying MD technology for the user, and every cell in the HLS is pre-qualified to join the active set, that is, the members of the active set are selected from the HLS of the user, and the active set is the subset of the HLS.

In addition, the present invention aims at improving the method for restraining inter-cell interference in a mobile communication system based on OFDMA technology. The method for restraining inter-cell interference in a mobile communication system is to allocate the frequency subchannels comprising FFR technology and MD technology, in which the basic topologies are as follows:

1. For a cell edge user, by implementing MD technology rather than the FFR technology in the reuse method for the cell edge with FRF larger than 1, a better signal quality is ensured. Thus, for the cell edge user, once the two technologies can be processed with fast dynamic selection, the system efficiency is believed to be improved.

2. The widely applied FFR technology has the advantage of improving cell edge capacity, but has the disadvantage of dramatically decreasing system capacity.

3. The present invention provides an efficient method for restraining inter-cell interference in downlink of an OFDMA mobile communication system. The present invention is configured to improve the data communication capacity of the cell edge user and maintain increased system capacity.

The concepts of operating the MD technology are as follows:

1. For a cell edge user, at least one cell or sector is configured to use a common frequency subchannel to transmit the same data contents to a user simultaneously, then the user properly combines and processes the signals and transfers the main interfered signals into useful signals to enhance the strength of the useful signals. However, a basic criterion for applying the MD technology has to be satisfied, that is, all the cells transmitting data have to use the same frequency subchannel.

2. For a user, all the cells in the handover list are the candidate serving cells when the handover is processed. To meet the requirements of handover, the signal quality of the cells in the handover list has to be good enough to satisfy a predetermined condition. Thus, all the cells in the handover list are the candidate serving cells for applying the MD technology.

3. For a cell edge user having a HLS larger than 1 (HLS>1), by making a plurality of cells in the handover list transmit the same data contents is able to improve the inter-cell interference and the link quality. The HLS means the number of the cell in the handover list. Since the serving cell is also contained in the handover list, the HLS of all users is larger than 1.

4. MD technology is accomplished by applying the soft handover technology comprising the softer handover or the multi-cell multiple-input multiple-output (MIMO) technology.

The method for restraining inter-cell interference in a mobile communication system of the present invention, compared with other conventional technologies, has the following advantages:

1. The present invention is configured to provide a better cell edge link quality and a better cell edge data rate, thus the cell edge capacity is dramatically increased.

2. The present invention is configured to provide a more uniformed user data rate distribution within the range covered by the cell. In consideration of the fairness of data rate between users, the present invention is able to increase the system capacity.

The aforementioned detail description is for explaining a particular embodiment of the present invention, and the embodiment is not applied to limit the present invention. The equivalent embodiment of modification after understanding the present invention shall be within the scope of the invention.

As aforementioned, the present invention is novel in technology and advantaged in many effects that the prior arts lack. The present invention conforms to the novelty and non-obviousness of patentability. It is asked that the examiner carefully consider the application of the present invention and allow the application.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for restraining inter-cell interference in a mobile communication system, comprising steps of:
    a determination step for determining whether a cell edge user is able to operate a Macro Diversity (MD) technology;
    a selection step for a base station to process a fast dynamic selection of an FFR technology or the MD technology according to an instantaneous link Signal Quality Index (SQI); and
    an allocation step for allocating frequency subchannels according to the selection result.

2. The method for restraining inter-cell interference in a mobile communication system as claimed in claim 1, wherein to determine whether the MD technology is able to be operated is determined by whether a Handover List Size (HLS) of the cell edge user is larger than 1.

3. The method for restraining inter-cell interference in a mobile communication system as claimed in claim 2, wherein the HLS is adapted to represent the number of cells in a user Handover List.

4. The method for restraining inter-cell interference in a mobile communication system as claimed in claim 1, wherein the selection step for fast and dynamically selecting FFR technology or MD technology is executed to select one of the two transmission technologies which acquires a better instantaneous link quality according to the instantaneous link SQI for the cell edge user during a time interval.

5. The method for restraining inter-cell interference in a mobile communication system as claimed in claim 4, wherein the instantaneous link SQI is adapted to be an instantaneous signal to interference plus noise ratio (SINR).

6. The method for restraining inter-cell interference in a mobile communication system as claimed in claim 1, wherein the MD technology in the selection step is realized by a soft handover technology or a multi-cell multiple-input multiple-output (MIMO) technology.

7. The method for restraining inter-cell interference in a mobile communication system as claimed in claim 6, wherein the soft handover technology comprises a softer handover.

8. The method for restraining inter-cell interference in a mobile communication system as claimed in claim 1, wherein the selection step for selecting FFR technology according to the allocated frequency subchannels is executed by allocating the frequency subchannel of an edge subband of a serving cell to the user.

9. The method for restraining inter-cell interference in a mobile communication system as claimed in claim 1, wherein the selection step for selecting MD technology according to the allocated frequency subchannels is executed by allocating a common frequency subchannel of a center subband of an active set cell to the user.

* * * * *